United States Patent
Pacelli et al.

(10) Patent No.: US 10,045,180 B2
(45) Date of Patent: Aug. 7, 2018

(54) METHOD AND APPARATUS FOR BEACON MESSAGING POINT OF SALE MESSAGING AND DELIVERY SYSTEM

(71) Applicants: Clayton Anthony Pacelli, South San Francisco, CA (US); John Joseph Casey, Foster City, CA (US); Elan Benjamin Samuel, Oakland, CA (US)

(72) Inventors: Clayton Anthony Pacelli, South San Francisco, CA (US); John Joseph Casey, Foster City, CA (US); Elan Benjamin Samuel, Oakland, CA (US)

(73) Assignee: Sony Interactive Entertainment America LLC, San Mateo, CA (US)

( * ) Notice: Subject to any disclaimer, the term of this patent is extended or adjusted under 35 U.S.C. 154(b) by 0 days.

(21) Appl. No.: 14/453,384

(22) Filed: Aug. 6, 2014

(65) Prior Publication Data

US 2016/0044442 A1    Feb. 11, 2016

(51) Int. Cl.
*H04B 7/00* (2006.01)
*H04W 4/80* (2018.01)
(Continued)

(52) U.S. Cl.
CPC .............. *H04W 4/80* (2018.02); *G06Q 20/18* (2013.01); *G06Q 20/202* (2013.01);
(Continued)

(58) Field of Classification Search
CPC .. G06Q 20/18; G06Q 20/202; G06Q 20/3278; G06Q 20/20; G06Q 30/0207;
(Continued)

(56) References Cited

U.S. PATENT DOCUMENTS

| 7,756,467 B2* | 7/2010 | Bent | H04L 69/18 340/539.1 |
| 8,019,365 B2* | 9/2011 | Fisher | G06Q 20/20 235/380 |

(Continued)

FOREIGN PATENT DOCUMENTS

| TW | 200408258 | 5/2004 |
| TW | 201329897 | 7/2013 |

OTHER PUBLICATIONS

International Search Report and Written Opinion for PCT International Application No. PCT/US2015/043648, dated Oct. 19, 2015.

(Continued)

*Primary Examiner* — April G Gonzales
(74) *Attorney, Agent, or Firm* — Womble Bond Dickinson (US) LLP

(57) ABSTRACT

An electronic kiosk receives a plurality of messages. The kiosk has a transceiver to utilize a set of radio communication technologies to detect and establish a radio communication link with a mobile computing device when the mobile computing device is located within proximity of the electronic kiosk. An application specific software program executes on a processor in the kiosk to provide as output one or more of the received plurality of messages depending on the location of the mobile computing device within the proximity of the electronic kiosk.

28 Claims, 6 Drawing Sheets

(51) Int. Cl.
*G06Q 20/18* (2012.01)
*G06Q 20/20* (2012.01)
*G06Q 20/32* (2012.01)
*H04W 4/00* (2018.01)
*H04W 88/02* (2009.01)

(52) U.S. Cl.
CPC ........ *G06Q 20/3278* (2013.01); *H04W 4/008* (2013.01); *H04W 88/021* (2013.01)

(58) Field of Classification Search
CPC ........... G06Q 30/0238; G06Q 20/3224; G06Q 30/0267; G06Q 20/327; G06Q 20/363; H04W 4/008; H04W 88/021; H04W 4/003; H04W 4/02; H04W 84/12; G07F 7/0886
USPC ................................................. 455/41.1, 41.2
See application file for complete search history.

(56) References Cited

U.S. PATENT DOCUMENTS

| | | | | |
|---|---|---|---|---|
| 8,190,087 B2* | 5/2012 | Fisher | ................ | G06Q 20/102 235/380 |
| 8,275,312 B2* | 9/2012 | Fisher | ................ | G06Q 20/20 455/41.2 |
| 2008/0051059 A1* | 2/2008 | Fisher | ................ | G06Q 20/20 455/410 |
| 2008/0132167 A1* | 6/2008 | Bent | ................ | H04W 4/02 455/41.2 |
| 2008/0262928 A1* | 10/2008 | Michaelis | ................ | G06Q 30/02 705/14.26 |
| 2010/0036670 A1* | 2/2010 | Hill | ................ | G06Q 30/016 705/304 |
| 2010/0274678 A1* | 10/2010 | Rolf | ................ | G06Q 20/04 705/17 |
| 2011/0022468 A1* | 1/2011 | Muster | ................ | G06Q 30/00 705/14.58 |
| 2011/0246284 A1* | 10/2011 | Chaikin | ................ | G06Q 20/105 705/14.38 |
| 2012/0190301 A1* | 7/2012 | Hart | ................ | H04M 1/7253 455/41.2 |
| 2012/0203572 A1* | 8/2012 | Christensen | ................ | G06Q 30/02 705/3 |
| 2012/0253852 A1* | 10/2012 | Pourfallah | ................ | G06Q 20/3276 705/4 |
| 2013/0124287 A1* | 5/2013 | Bjorn | ................ | G06Q 30/0215 705/14.23 |
| 2013/0131971 A1* | 5/2013 | Parrish | ................ | G06F 3/01 701/408 |
| 2013/0204697 A1* | 8/2013 | Boal | ................ | G06Q 30/0207 705/14.51 |
| 2013/0217333 A1* | 8/2013 | Sprigg | ................ | H04W 4/008 455/41.2 |
| 2013/0238392 A1* | 9/2013 | Sloan | ................ | G06Q 30/0201 705/7.29 |
| 2013/0246220 A1* | 9/2013 | Hammad | ................ | G06Q 30/0639 705/26.9 |
| 2013/0282438 A1* | 10/2013 | Hunter | ................ | G01S 1/02 705/7.32 |
| 2013/0325567 A1* | 12/2013 | Bradley | ................ | G06Q 30/02 705/14.1 |
| 2014/0006184 A1* | 1/2014 | Godsey | ................ | G06Q 20/08 705/16 |
| 2014/0225734 A1* | 8/2014 | Rasband | ................ | G08B 13/246 340/572.1 |
| 2015/0033289 A1* | 1/2015 | Caceres | ................ | H04W 12/08 726/3 |
| 2015/0278773 A1* | 10/2015 | Rolf | ................ | G06Q 20/02 705/39 |
| 2015/0332258 A1* | 11/2015 | Kurabi | ................ | G06Q 20/382 705/71 |

OTHER PUBLICATIONS

International Preliminary Report on Patentability for Application No. PCT/US2015/043648, dated Feb. 7, 2017, 6 pages.
First Office Action dated Oct. 28, 2016, Taiwan Appln No. 104125501.
First Office Action for Chinese Patent Application No. 201510702711.8, dated Apr. 6, 2017, 17 pages.
First Office Action for Taiwan Patent Application No. 104125501, dated May 31, 2017, 14 pages.

* cited by examiner

METHOD AND APPARATUS FOR BEACON MESSAGING POINT OF SALE MESSAGING AND DELIVERY SYSTEM

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments of the present invention relate to communications between an electronic kiosk and a mobile computing device in proximity of the kiosk. In particular, embodiments of the invention relate to passive and active transactions between the kiosk and the mobile computing device to guide or direct the actions of a user of the mobile computing device.

BACKGROUND

Today's interactive electronic kiosks bring together traditional vending machines with data communications and even complicated robotic and mechanical components. Such interactive kiosks can include self-checkout lanes at grocery stores, e-ticketing kiosks at airports, information and wayfinding kiosks in public places, and vending or retail sales kiosks in stores. Electronic kiosks have become a larger part of the retail landscape. Additionally, mobile computing devices are ubiquitous, with vast majorities of individuals in developed and developing countries having an "always-on" smartphone or the like in their possession all the time. What is needed is a way to facilitate and improve the interaction between today's interactive electronic kiosks and users, taking advantage of the ubiquity, and always-on nature, of mobile computing devices.

BRIEF DESCRIPTION OF THE DRAWINGS

Embodiments are illustrated by way of example, and not by way of limitation, and can be more fully understood with reference to the following detailed description when considered in connection with the figures in which.

DETAILED DESCRIPTION

Figure 1:
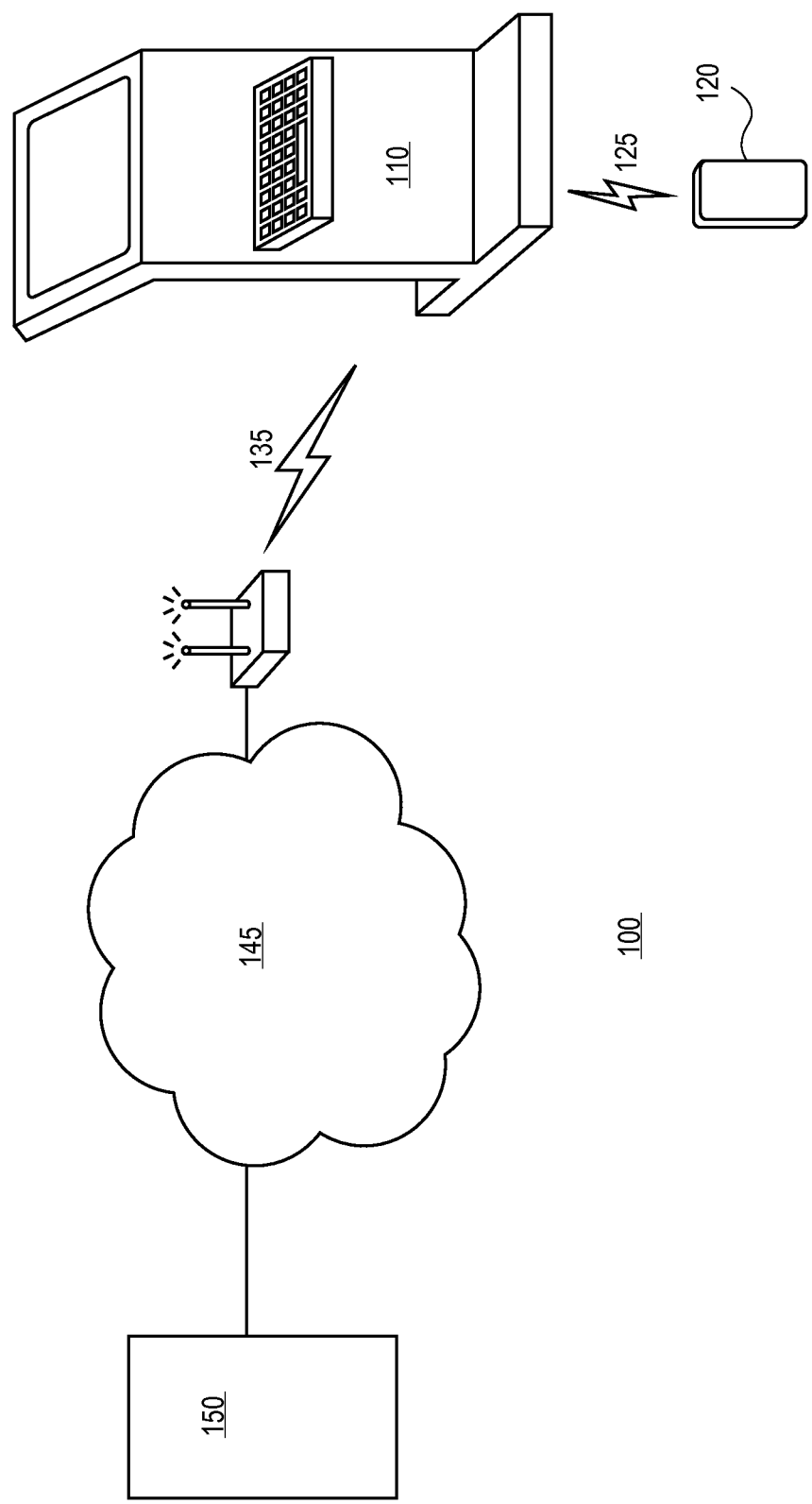
FIG. 1 illustrates an environment in which an embodiment of the invention may be practiced.

According to one embodiment of the invention, and as illustrated in the block diagram of FIG. 1, an electronic retail system 100 includes an interactive electronic kiosk 110 located, for example, in a retail store. An interactive kiosk is a computer terminal featuring hardware and software designed within a public exhibit that provides access to information and applications for such purposes as communication, commerce, entertainment, and education. While the kiosk depicted in FIG. 1 is free-standing, the kiosk may also be used while sitting on a bench, or chair. Interactive kiosks are typically placed in high foot traffic settings such as hotel lobbies, airports, or commercial displays. Integration of technology allows kiosks to perform a wide range of functions, evolving into unattended, or self-service kiosks. For example, kiosks may enable users to enter an account number in order to perform an online transaction, or collect cash in exchange for merchandise. Customized components such as coin hoppers, bill acceptors, card readers and thermal printers enable kiosks to meet the specific needs.

The kiosk in electronic retail system of claim 1 may function as one or more of a point-of-sale system, a point-of-purchase system, a return- or customer-order system, an inventory management system, a customer relationship management (CRM) system, a financials management system, a warehousing system, or a self-diagnostics system. As note above, however, the interactive kiosk, according to embodiments of the invention, has many uses outside the retail setting.

Figure 2:
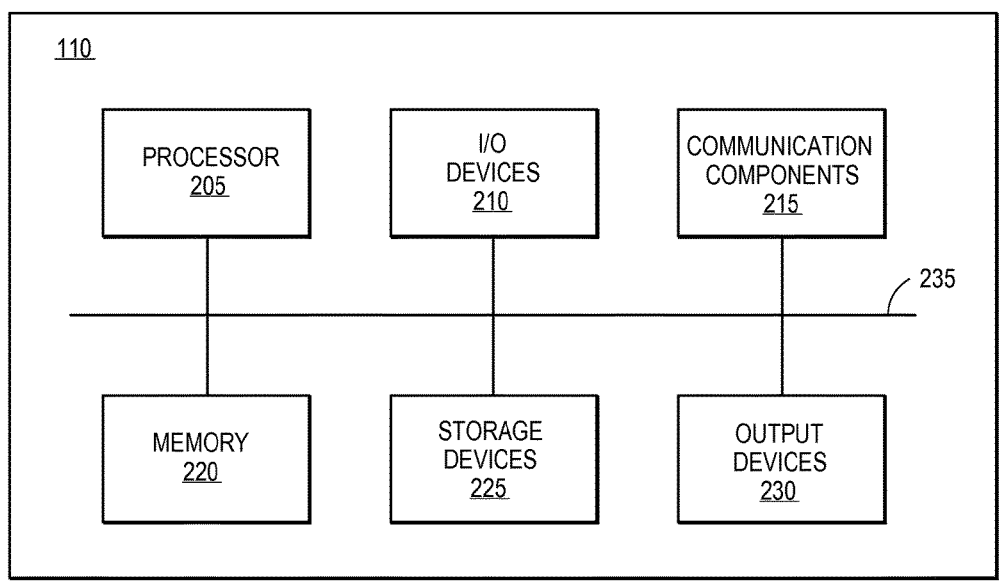
FIG. 2 is a block diagram of a kiosk in keeping with an embodiment of the invention.

FIG. 2 provides a block diagram 200 of many components of the kiosk 110, including: a processor 205 on which one or more software programs are executed to provide various features and applications for operation of the kiosk; input/output devices 210 such as a keyboard, mouse, scanner, microphone, gaming controller(s) as when the kiosk functions as a gaming console; communication components 215, such as a Local Area Network (LAN) connector or port (based on the IEEE 802.3 standards), Wi-Fi components (wireless local area network (WLAN) products that are based on the IEEE 802.11 standards), Bluetooth components (operating according to standards defined by the Bluetooth Special Interest Group (SIG)), and mobile or cellular telephone components; output devices 230 such as an electronic display screen, printer, and audio speakers; electronic or electromagnetic storage devices 225 such as a hard disk for recording and/or storing data or the above-mentioned software programs; and system memory 220, such a random-access memory (RAM). These various components are connected and communicate with each other according to well-known computer architecture techniques, for example, using a communication bus 235.

In one embodiment, a data input port such as a LAN or Wi-Fi port at 215 receives messages over a respective communication link 135, for delivery to mobile computing device 120 over a communications link 125. These messages, according to one embodiment, are targeted to a user of the mobile computing device as a prospective consumer of products or services offered by the product or service provider via the kiosk. As an example, FIG. 1 illustrates a line 135 representing a communications link that connects kiosk 110 via Wi-Fi to a wireless router/broadband modem 130. The router 130, in turn, provides access to a server 150 via an internetwork 145. The internetwork may be a private network, a public network, of a virtual local area network via which the messages are transmitted from server 150 to kiosk 110. In one embodiment, server 150 is co-located or even integrated with kiosk 110 at a particular location, such as a retail store. In other embodiments, the server may be remotely located, for example, at corporate headquarters for the owner of the kiosk, or at a location for a third-party service provider that operates/communicates with the kiosk.

Kiosk 110 includes a data storage component in which to store the received messages. For example, the messages may be cached or temporarily stored in a dynamic memory at 220 or stored on a more permanent basis in a nonvolatile storage device at 225.

A transceiver at 215, according to an embodiment of the invention, utilizes a set of radio communication technologies to detect and establish a radio communication link 125 with the mobile computing device 120 when the mobile computing device is located within proximity of the kiosk. In one embodiment, the set of radio communication technologies comprise a near field communications (NFC) set of short-range wireless radio communication technologies via which the transceiver is to detect and establish radio communication with the mobile computing device.

Near field communication (NFC) is a set of personal area network standards for smartphones and similar mobile computing devices to establish radio communication with other similarly equipped devices by touching them together or bringing them into close proximity. Embodiments of the invention contemplate NFC applications such as contactless transactions, data exchange, and simplified setup of more complex communications such as Wi-Fi, with mobile computing device 120. Currently, NFC standards cover communications protocols and data exchange formats based on existing radio-frequency identification (RFID) standards including ISO/IEC 14443, FeliCa (FeliCa is a contactless Radio Frequency Identification (RFID) smart card system from Sony Corporation, primarily used in electronic money cards), ISO/IEC 18092, and further standards defined by the NFC Forum.

In one embodiment, the kiosk's transceiver receives a tag, for example, an NFC tag, identifying the mobile computing device or a user thereof. In such an embodiment, the application specific software program executing on the kiosk provides one or more of messages to the mobile computing device further depending on the identifying tag.

In one embodiment, an application specific software program executes on the processor 205 to output one or more of the received messages depending on, at least, for example, the location of the mobile computing device 120 within proximity of the electronic kiosk. In one embodiment, the application specific software program displays one or more of the received messages on the display device at 230 depending on the location of the mobile computing device 120 within the proximity of the electronic kiosk 110. In another embodiment, the application specific software program further or alternatively transmits one or more of the received messages to the mobile computing device 120 within the proximity of the electronic kiosk 110 via the established radio communication link 125. According to an embodiment, the mobile computing device 120 includes an application-specific software program to receive and output the transmitted one or more messages to a user of the mobile computing device. For example, the output may be transmitted visually to a display screen on the mobile computing device and/or transmitted aurally via a speaker in the mobile computing device.

While the embodiments described herein refer to a mobile computing device, it is understood that embodiments contemplate a variety of devices operating in this capacity, including but not limited to, smartphones, notebook computers, laptop computers, tablet computers, gaming devices/consoles such as a Sony PlayStation Vita gaming console, key fobs, and wearable computing devices. Wearable computing devices are small or miniature electronic devices that are worn by a user under, with, in, or on top of, clothing, and in which there is a constant or near constant interaction between the wearable computer and user, i.e. there is no need to turn the device on or off. Another feature of a wearable computing device is the ability of the device to multi-task, so it is not necessary to stop what the user is doing to use the device; it is augmented into all the user's actions making it an appropriate and useful device in embodiments of the invention.

Figure 3:
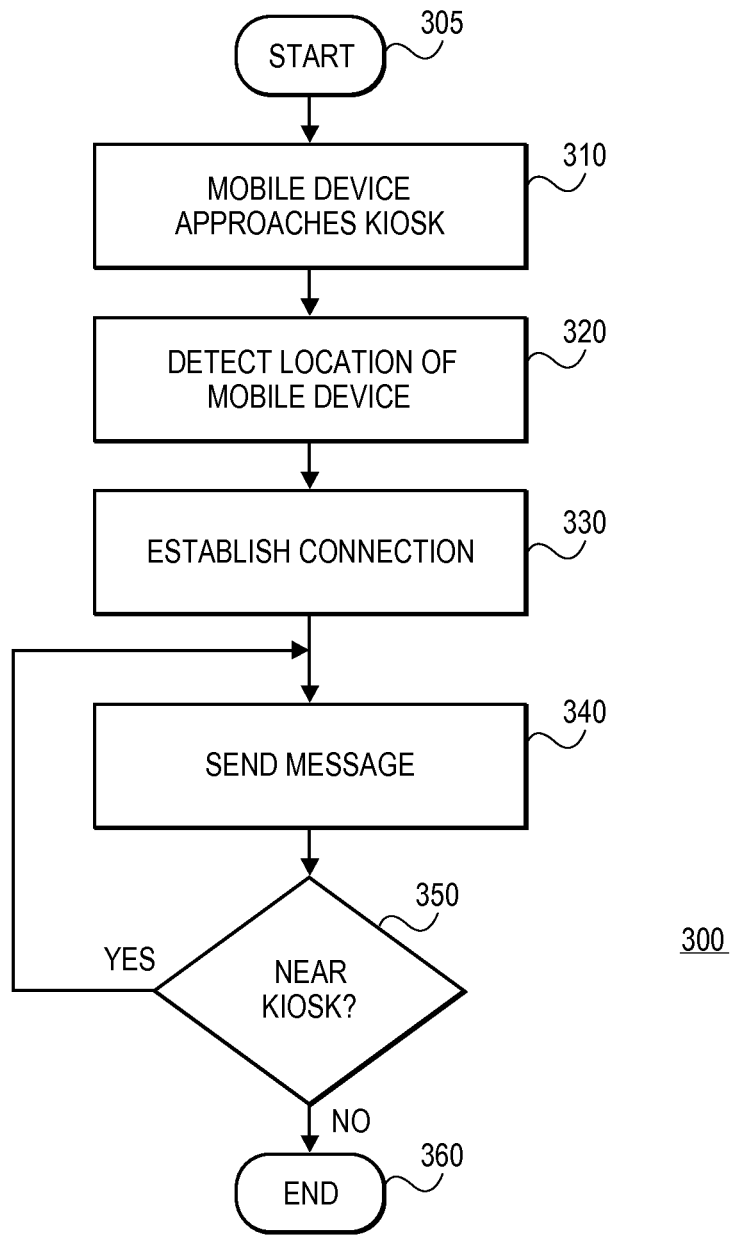
FIG. 3 provides a flow diagram of an embodiment of the invention.

With reference to FIG. 3, the process 300 for communicating between the kiosk and a user of a mobile computing device in proximity of the kiosk is now described. The process starts at 305 with the kiosk powered up and operating, perhaps displaying a blank screen or initial message prompting a user to select one or more operations or functions to perform with the kiosk. At 310, a user with a mobile computing device on or near his or her person (for example, a user with a mobile phone situated in a pocket or purse or bag) approaches the vicinity of the kiosk. Radio communications technology operating on the electronic kiosk detects the presence of the user's mobile computing device at 320 as, or soon after, the user approaches the kiosk.

Upon detection, a connection between the two devices occurs at 330. For example, according to one embodiment, an electronic leash, or pairing occurs between the kiosk and the mobile computing device without the user having to take any action on the mobile computing device. In one embodiment, the electronic leash establishes the ability measure the distance of the mobile computing device from the kiosk.

In one embodiment, the electronic leash or pairing is best suited for "always-on" devices that are implemented according to appropriate specifications for the device to make use of proximity sensing capabilities. For example, BLE's proximity profile (PXP) feature allows a proximity monitor operating on the kiosk (or mobile computing device) to detect whether a proximity reporter operating on a mobile computing device (or the kiosk) is within a close range. In one embodiment, physical proximity of the mobile computing device to the kiosk can be estimated using the kiosk's radio receiver's received signal strength indication (RSSI) value, although such does not necessarily provide absolute calibration of distances. Typically, a triggering event occurs when the distance between the devices falls within or exceeds a set or configurable threshold, thereby notifying the kiosk of the device's location.

In another embodiment, the electronic leash or pairing can be accomplishing using near field communications (NFC). NFC builds upon RFID systems by allowing two-way communication between endpoints, for example, the kiosk and the mobile computing device. In one embodiment, NFC is used to enable Bluetooth on both devices, instantly pair them, and then disable Bluetooth automatically on both devices once the desired task, such as the exchange of one or more messages, has completed. In another embodiment, NFC is used to share MAC Address and IP addresses between the kiosk and mobile computing device, and then Wi-Fi or other communications technology (e.g., Wi-Fi Direct) may be used to share messages, especially larger messages, or even files and documents. In one embodiment, NFC can be used in electronic social networking situations, such as sharing activities, locations, contacts, photos, videos or files, and entering multiplayer mobile games.

In one embodiment, the mobile computing device, equipped with NFC technology, can be paired with NFC tags (electronic or physical) that can be programmed by NFC-based applications to automate tasks. These programs can allow for a change of kiosk or mobile computing device settings, a text or other messages to be created and displayed or transmitted, an application to be launched, or any number of commands to be executed, as programmed by the NFC application and other applications executing on the kiosk and/or the mobile computing device. For example, such embodiments provide for the ability to the kiosk owner or operator to conduct real-time, customized advertising targeted directly to the user, based on the user's profile and preferences. According to one embodiment, when an NFC-capable kiosk or mobile computing device is placed or 'tapped' on a physical tag, a programmed action may be undertaken, such as causing a website or other content to be displayed on either or both of the kiosk's and mobile computing device's display screen, the kiosk or mobile computing device switched to a particular mode or application, or many other possible actions. In particular, use of NFC tags allows for an active-, as opposed to passive-user interaction with the kiosk and one or more applications executing thereon.

According to one embodiment, NFC tags are employed when the mobile computing device is in very close range of the kiosk, for example, when only a few inches away or almost touching the mobile computing device to a tag on the kiosk (or vice versa). In this manner, NFC tags have no effect unless there is a clear user action to trigger the tag.

In one embodiment, although mobile computing devices are usually touched to tags, tagging does not necessarily require any docking or galvanic contact with the tag, so NFC tags are considered to be a non-contact, or contactless, technology, and thus available for use in contactless payment systems such as credit cards and debit cards, key fobs, smartcards or other devices that use radio-frequency identification for making secure payments. In one embodiment, an embedded chip and antenna enable a user to wave their mobile computing device over a reader at the kiosk.

After a connection or pairing is established between the kiosk and the computing device, a first message 340 is transmitted to the mobile computing device and/or displayed on the kiosk's display screen. For example, the message may welcome the user of the mobile computing device to the kiosk. In one embodiment, the application specific software program executing on the kiosk's processor outputs the message depending on the location of the mobile computing device within the proximity of the electronic kiosk. For example, the message is sent with the mobile computing device first comes within range of the kiosk and is detected.

The kiosk can continue to monitor the location of the user/mobile computing device at 350 and if the user remains within proximity of the kiosk, or, for example, moves closer to the kiosk, a second message 340 may be output to the user (on the kiosk's and/or user's mobile computing device's display device). For example, the message may direct the user to a point of interest or activity in a retail environment in which the electronic kiosk is located. Yet a different message may be output if the user fails to change locations after a selected period of time, or moves away from the kiosk. This process may continue, for example, the electronic kiosk may monitor at 350 and then transmit at 340 a third message that prompts the user to participate in the activity in a retail environment in which the electronic kiosk is located responsive to detecting a change in the location of the mobile computing device to within close or very close proximity of the kiosk, and so on.

Figure 4:
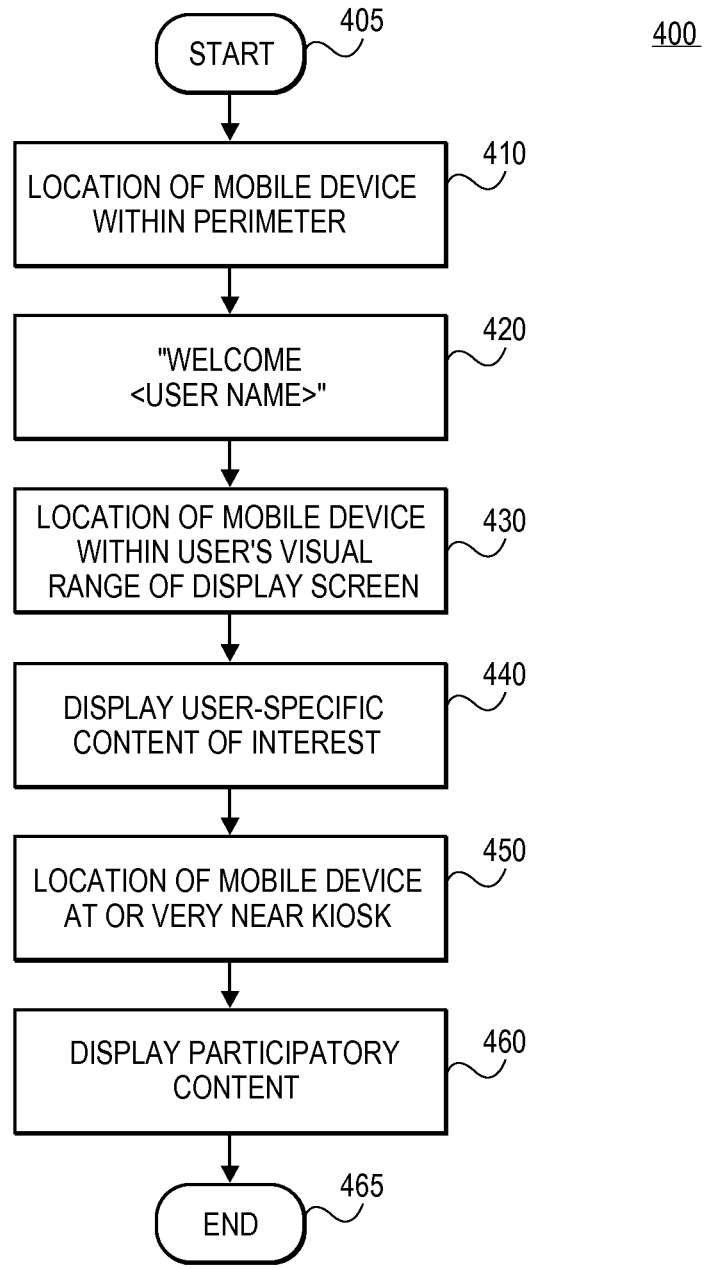
FIG. 4 provides a flow diagram of an embodiment of the invention.

An example 400 of the embodiment described above is illustrated in FIG. 4. When a user with a mobile computing device approaches a kiosk, the kiosk detects the presence of the user's mobile computing device when it first comes within a certain distance or perimeter or circumference of the kiosk at 410. Upon detection, a connection between the two devices occurs, for example, according to one embodiment, an electronic leash or pairing occurs between the kiosk and the mobile computing device without the user having to take any action on the mobile computing device. In one embodiment, the electronic leash establishes the ability measure the distance of the mobile computing device from the kiosk. After a connection or pairing is established between the kiosk and the computing device, a first welcome message is transmitted to the mobile computing device and/or displayed on the kiosk's display screen at 420. For example, the message may welcome, by name, the user of the mobile computing device to the kiosk.

The kiosk can continue to monitor the location of the user/mobile computing device at 430 and if the user remains within proximity of the kiosk, or, for example, moves close enough to the kiosk that a typical user of the mobile computing device can readily see the kiosk's display screen, a second message 440 may be output to the user (on the kiosk's and/or user's mobile computing device's display device). For example, the message may provide content that is considered to be specifically of interest to the identified user. If the electronic kiosk detects at 450 that the user has advanced even further toward the kiosk so that the user is near enough to physically contact or touch an input device of the kiosk, such as an interactive display screen or keyboard, the kiosk may then transmit at 460 further content including a third message that prompts the user to participate in an activity with the kiosk.

In embodiments of the invention, the kiosk may receive messages from the mobile computing device. For example, the mobile computing device may transmit information about the user of the mobile computing device, such as profile information (e.g., shopping habits) or preferences information (e.g., user's mobile computing device currently in a "do not disturb" mode) for the user. The kiosk can perform operations based on, or responsive to, the exchange of messages with the mobile computing device, including, for example: providing, or not, information about a user of the mobile computing device to a social media software application; operations relating to a location-based services software application; providing, or not, information to the user including diagnostics, product version, or upgrade information about the electronic kiosk or mobile computing device; payment options or discounts relating to a retail purchase executed using the electronic kiosk or other point-of-service system in or accessible to the retail environment in which the electronic kiosk is located; customized information for output on an electronic display device of the electronic kiosk or the mobile computing device including selected advertising, awards, coupons, third party supplier information, and electronic gaming trophies. For example, an embodiment may "game-ify" a transaction between the kiosk and a user by transmitting or tagging to the user a trophy based on the transaction or outcome thereof, or transmit a coupon or Stock Keeping Unit (SKU) code to the user based on a transaction between the user and the kiosk that can be used in making an in-store or online purchase.

Figure 5:
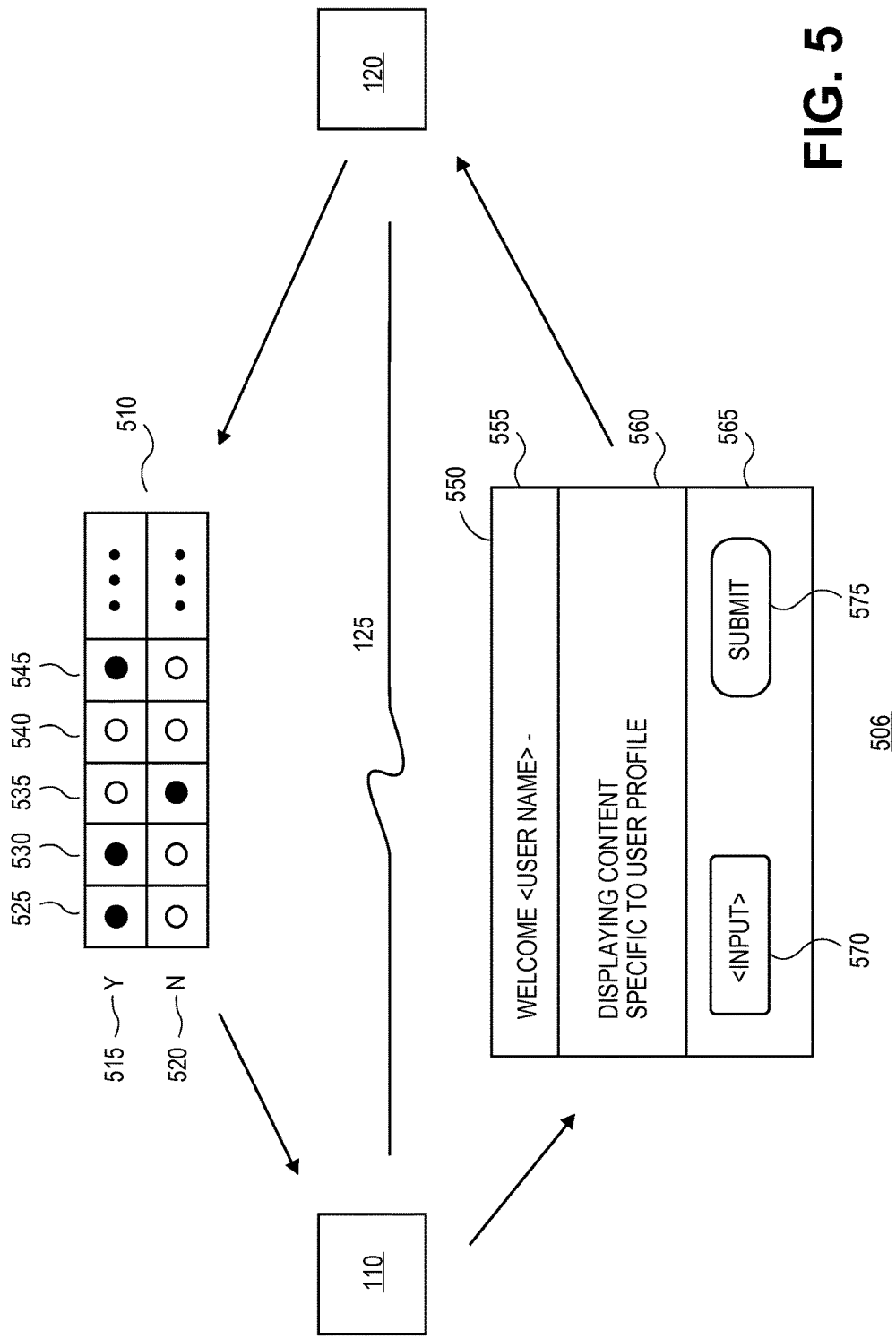
FIG. 5 illustrates an embodiment of the invention.

With reference to FIG. 5, in one embodiment 500, the mobile computing device 120, equipped with NFC technology, can be paired with NFC tags (electronic or physical) that can be programmed by NFC-based applications to automate tasks. These programs can allow for a change of kiosk 110 or mobile computing device 120 settings, a text message or other messages to be created and displayed or transmitted, an application to be launched, or any number of commands to be executed, as programmed by an NFC-based or enabled application and other applications executing on the kiosk and/or the mobile computing device. As mentioned above, the kiosk owner or operator may conduct real-time, customized advertising 550 targeted directly to the user, based on the user's profile and preferences 510.

For example, a user of mobile computing device 120 transmits a profile 510 that identifies a number of preferences, each depicted in one of columns 525-545 in FIG. 5. In one embodiment, the user is a gamer who plays video games or board games and the preferences define whether the user is interested in particular game features, as depicted by "yes" buttons in row 515 or not interested as depicted by "no" buttons in row 520. As examples, preference 525 indicates the user is interested in games that involve shooting, preference 530 indicates the user in interested in games that do not depict excessive violence or provide the ability to configure such, preference 535 indicates the user is not interested in games that involve racing vehicles or such, preference 540 relating to sports-type games is not specified by the user, and preference 545 indicates the user is interested in receiving content regarding new movie releases.

The kiosk 110 can output customized content at 550 for display on the kiosk's display screen and/or the user's mobile computing device display screen, including a welcome message specifically targeted to the user at 555, display content specific to the user based on the user's profile at 560, and seek interaction with the user at 565 by providing a window at 570 in which the user may enter input and means by which to submit such input such as a "submit" button at 575.

Figure 6:
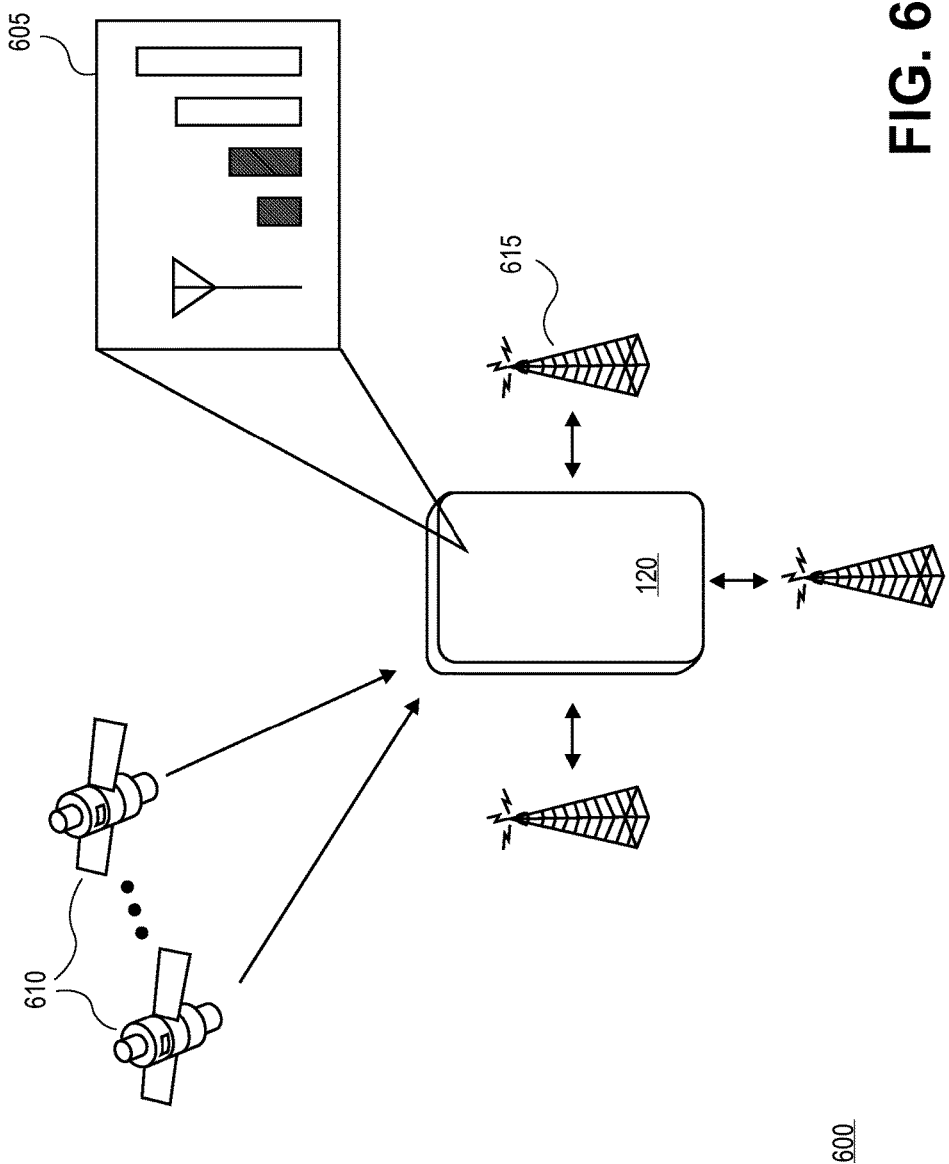
FIG. 6 illustrates an aspect of an embodiment of the invention.

In one embodiment 600, with reference to FIG. 6, given the omni-connected nature of mobile computing devices, the location of the mobile computing device 120 within the proximity of the electronic kiosk may be determined according to one or more location-based services application executing on the mobile computing device, such as: a received signal strength indication (RSSI) of the mobile computing device, depicted at 605; global positioning system (GPS) data provided by or associated with the mobile computing device, depicted at 610; tracking of mobile phone radio signals between a plurality of cellular mobile radio towers of a cellular telephone network and the mobile computing device, depicted at 615. The location of the mobile computing device may be determined according to other method as well, not depicted in FIG. 6, including Bluetooth Low Energy (BLE) beacons; social media check-ins; and grey-data (e.g., ATM, debit, or credit card transactions/payment information).

An embodiment of the invention may be a machine-readable medium having stored thereon instructions that cause a programmable processor to perform operations as described above. In other embodiments, the operations might be performed by specific hardware components that contain hardwired logic. Those operations might alternatively be performed by any combination of programmed computer components and custom hardware components.

A machine-readable medium may include any mechanism for storing in non-transitory form, information in a form readable by a machine (e.g., a computer), including but not limited to Compact Disc Read-Only Memory (CD-ROM), Read-Only Memory (ROM), Random Access Memory (RAM), and [Electrically] Erasable Programmable Read-Only Memory ([E]EPROM).

The applications of the present invention have been described largely by reference to specific examples and in terms of particular allocations of functionality to certain hardware and/or software components. However, those of skill in the art will recognize that the present invention may be configured in various contexts. For example, although this example provided was targeting "audio visual" programs the "gist" of the present invention can be suited to audio only systems. For example, a device that is primarily an audio device like a networked iPod® or Zune® may receive an FM broadcast of a primary stream containing commercials. In certain embodiments of the present invention, the content analyzer does not need to be present in an end-user device of the present invention. In these cases, the content analysis function may be done remotely over a network by other devices and the signal output from the content analyzer may be transmitted over a WAN, LAN, wired or wireless it may be carried at or near the spectrum of the transmission and including but not limited to AM or FM broadcast bands, Cellular, Satellite bands, etc. Data output from the content analyzer may be modulated in any fashion so long as the end-user device can be prompted of commercial events and discriminate to determine the commercial break status for a currently tuned channel or for a primary or a reference stream. Content analysis function may broadcast signals for a plurality of channels on a signal or multiple channels, sidebands of channel or channels, etc. The device may detect itself or receive from another device or process a notice of a commercial break then causing it to play a secondary stream during the break then resume back to the program upon notice of resumption event. Again, the secondary stream may be alternative set of advertisements. Such variations and implementations are understood to fall within the scope of the following claims.

What is claimed is:

1. An electronic kiosk comprising:
   a processor;
   a data input port via which to receive a plurality of messages;
   a data storage component in which to store the messages;
   a transceiver to utilize a set of radio communication technologies to detect and establish a radio communication link with a mobile computing device when the mobile computing device is located within proximity of the electronic kiosk, to receive a tag from the mobile computing device that identifies the mobile computing device or a user thereof upon establishment of the radio communication link;
   the transceiver to further receive a user profile from the mobile computing device that identifies a number of preferences for the user of the mobile computing device; and
   an application specific software program to execute on the processor to output one or more of the received plurality of messages depending on the location of the mobile computing device within the proximity of the electronic kiosk and based further upon the user profile and the preferences identified by the user profile, wherein the processor is configured to cause the application specific software program to output a first message when the mobile computing device is at a first location relative to the electronic kiosk, wherein the processor is configured to determine if the mobile computing device is moved to a second location that is closer to the electronic kiosk than the first location, wherein the processor is configured to cause the application specific software program to output a second message that provides content that is more specifically of interest to the user than the first message if the mobile computing device is moved to the second location.

2. The electronic kiosk of claim 1, wherein the set of radio communication technologies comprise a near field communications (NFC) set of short-range wireless radio communication technologies via which the transceiver is to detect and establish radio communication with the mobile computing device.

3. The electronic kiosk of claim 2, further comprising an electronic display device, and wherein the application specific software program to output the one or more of the plurality of messages depending on the location of the mobile computing device within the proximity of the electronic kiosk comprises the application specific software program to display one or more of the plurality of messages on the display device depending on the location of the mobile computing device within the proximity of the electronic kiosk.

4. The electronic kiosk of claim 2, wherein the application specific software program to output the one or more of the plurality of messages depending on the location of the mobile computing device within the proximity of the electronic kiosk comprises the application specific software program to transmit one or more of the plurality of messages to the mobile computing device within the proximity of the electronic kiosk via the established radio communication link.

5. The electronic kiosk of claim 4, wherein the mobile computing device comprising an application-specific software program to receive and output the transmitted one or more of the plurality of messages to a user of the mobile computing device.

6. The electronic kiosk of claim 1, wherein the electronic kiosk functions as one or more of a point-of-sale system, a point-of-purchase system, a return system, a customer-order system, an inventory management system, a customer relationship management (CRM) system, a financials management system, a warehousing system, a self-diagnostics system.

7. The electronic kiosk of claim 1, wherein the data input port via which to receive the plurality of messages comprises a local area network (LAN) port via which to receive the plurality of messages.

8. The electronic kiosk of claim 7, wherein the plurality of messages are received from an application-specific server accessible to the electronic kiosk via a local area network (LAN) coupled to the LAN port.

9. The electronic kiosk of claim 8, wherein the application-specific server is accessible via an internetwork connection to the LAN.

10. The electronic kiosk of claim 1, wherein the set of radio communication technologies comprise a Bluetooth technology via which the transceiver is to detect and establish radio communication with the mobile computing device.

11. The electronic kiosk of claim 10, wherein the Bluetooth technology comprises a Bluetooth Low Energy wireless personal area communication network technology operating compatibly with the mobile computing device according to Bluetooth Smart and Bluetooth Core Specification Version 4.0.

12. The electronic kiosk of claim 1, wherein the received plurality of messages comprises the first message that welcomes a user of the mobile computing device, and wherein the application specific software program to execute on the processor to output one or more of the received plurality of messages depending on the location of the mobile computing device within the proximity of the electronic kiosk comprises the application specific software program to output the first message responsive to detecting the first location of the mobile computing device within the proximity of the electronic kiosk.

13. The electronic kiosk of claim 12, wherein the received plurality of messages comprises the second message that directs the user to a point of interest or activity in a retail environment in which the electronic kiosk is located, and wherein the application specific software program to execute on the processor to output one or more of the received plurality of messages depending on the location of the mobile computing device within the proximity of the electronic kiosk comprises the application specific software program to output the second message responsive to detecting a change in the location of the mobile computing device from the first location to the second location within a nearer proximity of the electronic kiosk than the first location.

14. The electronic kiosk of claim 13, wherein the received plurality of messages comprises a third message that prompts the user to participate in the activity in a retail environment in which the electronic kiosk is located, and wherein the application specific software program to execute on the processor to output one or more of the received plurality of messages depending on the location of the mobile computing device within the proximity of the electronic kiosk comprises the application specific software program to output the third message responsive to detecting a change in the location of the mobile computing device from the second location to a third location that is closer to the electronic kiosk than the second location.

15. The electronic kiosk of claim 1, wherein the transceiver further to utilize the set of radio communication technologies to receive messages from the mobile computing device when the mobile computing device is located within proximity of the electronic kiosk; and
wherein the application specific software program further to execute operations on the processor responsive to the messages received from the mobile computing device.

16. The electronic kiosk of claim 15, wherein the operations comprise providing, or not providing, information about a user of the mobile computing device to a social media software application, a location-based services software application, providing, or not providing, information to the user including diagnostics, version or upgrade information, about the electronic kiosk or mobile computing device, payment options or discounts relating to a retail purchase executed using the electronic kiosk or other point-of-service system in or accessible to the retail environment in which the electronic kiosk is located, customized information for output on an electronic display device of the electronic kiosk or the mobile computing device including selected advertising, awards, coupons, third party supplier information, and electronic gaming trophies.

17. The electronic kiosk of claim 1, wherein the location of the mobile computing device within the proximity of the electronic kiosk is determined according to one or more of a location-based services application executing on the mobile computing device, a received signal strength indication of the mobile computing device, global positioning system (GPS) data provided by or associated with the mobile computing device, or tracking of mobile phone radio signals between a plurality of cellular mobile radio towers of a cellular telephone network and the mobile computing device.

18. The electronic kiosk of claim 1, wherein the mobile computing device is selected from a group of mobile computing devices consisting of an electronic gaming console, a mobile telephone, a laptop computer, a notebook computer, and a tablet computer.

19. Non-transitory computer readable storage media having instructions stored thereupon that, when executed by a processor of an electronic kiosk, the instructions cause the electronic kiosk to communicate with a nearby mobile computing device by performing operations comprising:

receiving a plurality of messages at a data input port;

detecting and establishing a radio communication link between a transceiver in the kiosk and the mobile computing device, using a set of radio communication technologies, when the mobile computing device is located within proximity of the electronic kiosk, to receive a tag from the mobile computing device that identifies the mobile computing device or a user thereof upon establishment of the radio communication link;

receiving a user profile from the mobile computing device that identifies a number of preferences for the user of the mobile computing device; and executing an application specific software program on a processor in the kiosk to output one or more of the received plurality of messages depending on the location of the mobile computing device within the proximity of the electronic kiosk and based further upon the user profile and the preferences identified by the user profile, wherein the application specific software program is executed to output a first message when the mobile computing device is at a first location relative to the electronic kiosk;

wherein the application specific software program is executed to output a second message that provides content that is more specifically of interest to the user than the first message, if it is determined that the mobile computing device is moved to the second location.

20. The non-transitory computer readable storage media of claim 19, wherein the set of radio communication technologies comprise a near field communications (NFC) set of short-range wireless radio communication technologies via which the transceiver is to detect and establish radio communication with the mobile computing device.

21. The non-transitory computer readable storage media of claim 20, wherein the instructions for executing the application specific software program to output the one or more of the plurality of messages depending on the location of the mobile computing device within the proximity of the electronic kiosk comprises instructions for executing the application specific software program to display one or more of the plurality of messages on a display device in the kiosk depending on the location of the mobile computing device within the proximity of the electronic kiosk.

22. The non-transitory computer readable storage media of claim 20, wherein the instructions for executing the application specific software program to output the one or more of the plurality of messages depending on the location of the mobile computing device within the proximity of the electronic kiosk comprises instructions for executing the application specific software program to transmit one or more of the plurality of messages to the mobile computing device within the proximity of the electronic kiosk via the established radio communication link.

23. The non-transitory computer readable storage media of claim 19, wherein the received plurality of messages comprises the first message that welcomes a user of the mobile computing device, and wherein the application specific software program to output one or more of the received plurality of messages depending on the location of the mobile computing device within the proximity of the electronic kiosk comprises the application specific software program to output the first message responsive to detecting the first location of the mobile computing device within the proximity of the electronic kiosk.

24. The non-transitory computer readable storage media of claim 23, wherein the received plurality of messages comprises the second message that directs the user to a point of interest or activity in a retail environment in which the electronic kiosk is located, and wherein the application specific software program to output one or more of the received plurality of messages depending on the location of the mobile computing device within the proximity of the electronic kiosk comprises the application specific software program to output the second message responsive to detecting a change in the location of the mobile computing device from the first location to the second location to within a nearer proximity of the electronic kiosk than the first location.

25. The non-transitory computer readable storage media of claim 24, wherein the received plurality of messages comprises a third message that prompts the user to participate in the activity in a retail environment in which the electronic kiosk is located, and wherein the application specific software program to output one or more of the received plurality of messages depending on the location of the mobile computing device within the proximity of the electronic kiosk comprises the application specific software program to output the third message responsive to detecting a change in the location of the mobile computing device from the second location to a third location that is closer within close proximity of the electronic kiosk than the second location.

26. The non-transitory computer readable storage media of claim 19, wherein establishing a radio communication link between a transceiver in the kiosk and the mobile computing device, using a set of radio communication technologies, when the mobile computing device is located within proximity of the electronic kiosk further comprises using the set of radio communication technologies to receive messages from the mobile computing device when the mobile computing device is located within proximity of the electronic kiosk; and wherein the instructions for executing the application specific software program further to execute operations on the processor responsive to the messages received from the mobile computing device.

27. A method performed by an electronic kiosk having at least a memory and a processor and a transceiver therein having been configured to communicate with a nearby mobile computing device, wherein the method comprises:

receiving a plurality of messages at a data input port;

detecting and establishing a radio communication link between the transceiver of the kiosk and the mobile computing device, using a set of radio communication technologies, when the mobile computing device is located within proximity of the electronic kiosk, to receive a tag from the mobile computing device that identifies the mobile computing device or a user thereof upon establishment of the radio communication link;

receiving a user profile from the mobile computing device that identifies a number of preferences for the user of the mobile computing device; and executing an application specific software program on a processor in the kiosk to output one or more of the received plurality of messages depending on the location of the mobile computing device within the proximity of the electronic kiosk and based further upon the user profile and the preferences identified by the user profile, wherein the application specific software program is executed to output a first message when the mobile computing device is at a first location relative to the electronic kiosk;

wherein the application specific software program is executed to output a second message that provides content that is more specifically of interest to the user than the first message, if it is determined that the mobile computing device is moved to the second location.

28. The method of claim 27;

wherein the set of radio communication technologies comprise a near field communications (NFC) set of short-range wireless radio communication technologies via which the transceiver is to detect and establish radio communication with the mobile computing device; and wherein the method further comprises outputting, via the application specific software program, the one or more of the plurality of messages depending on the location of the mobile computing device within the proximity of the electronic kiosk comprises instructions for executing the application specific software program to display one or more of the plurality of messages on a display device in the kiosk depending on the location of the mobile computing device within the proximity of the electronic kiosk.

* * * * *